(12) United States Patent
Radovich et al.

(10) Patent No.: US 9,903,339 B2
(45) Date of Patent: Feb. 27, 2018

(54) VERTICAL AXIS WIND TURBINE WITH VARIABLE PITCH MECHANISM

(75) Inventors: Walter Radovich, Ingleburn (AU);
Ricky Zhong Huang, Ingleburn (AU);
Bjorn Rudgley, Ingleburn (AU); Jing K Tan, Ingleburn (AU)

(73) Assignee: Axowind Pty Ltd., Sylvania NSW (AU)

( * ) Notice: Subject to any disclaimer, the term of this patent is extended or adjusted under 35 U.S.C. 154(b) by 978 days.

(21) Appl. No.: 14/360,936

(22) PCT Filed: Jun. 29, 2012

(86) PCT No.: PCT/AU2012/000792
§ 371 (c)(1),
(2), (4) Date: Aug. 11, 2014

(87) PCT Pub. No.: WO2013/000041
PCT Pub. Date: Jan. 3, 2013

(65) Prior Publication Data
US 2015/0003982 A1    Jan. 1, 2015

(30) Foreign Application Priority Data

Jun. 29, 2011  (AU) ................................ 2011902557
Jun. 25, 2012  (AU) ................................ 2012902671

(51) Int. Cl.
*F03D 7/02*       (2006.01)
*F03D 3/06*       (2006.01)
*F03D 7/06*       (2006.01)

(52) U.S. Cl.
CPC .......... *F03D 7/0224* (2013.01); *F03D 3/062* (2013.01); *F03D 7/06* (2013.01); *F05B 2240/214* (2013.01); *F05B 2260/72* (2013.01); *F05B 2260/77* (2013.01); *F05B 2260/78* (2013.01); *Y02E 10/74* (2013.01)

(58) Field of Classification Search
None
See application file for complete search history.

(56) References Cited

U.S. PATENT DOCUMENTS

| | | | |
|---|---|---|---|
| 4,052,134 A * | 10/1977 | Rumsey | F03D 3/067 416/119 |
| 4,430,044 A | 2/1984 | Liljegren | |
| 6,784,566 B2 * | 8/2004 | Thomas | F03D 3/02 290/44 |
| 2007/0248450 A1 | 10/2007 | Migler | |

FOREIGN PATENT DOCUMENTS

| | | | | |
|---|---|---|---|---|
| DE | 202008010290 U1 | 12/2008 | | |
| FR | 2481756 | 11/1981 | | |
| FR | 2481756 A1 * | 11/1981 | ............... | F03D 7/06 |
| WO | 03102413 A1 | 12/2003 | | |

* cited by examiner

*Primary Examiner* — Dwayne J White
*Assistant Examiner* — Juan G Flores
(74) *Attorney, Agent, or Firm* — Mark M. Friedman

(57) ABSTRACT

A vertical axis wind turbine including a vertical central shaft and a plurality of vertical blades. Each of the vertical blades is supported by a radial supporting arm extending from the central shaft. The shaft is such that the angular disposition of each of the blades is relative to its radial supporting arm, and is controlled by a control mechanism. The control mechanism includes two differential resilient elements and a damping element.

17 Claims, 6 Drawing Sheets

VERTICAL AXIS WIND TURBINE WITH VARIABLE PITCH MECHANISM

The present invention relates to vertical axis wind turbines (VAWTs).

BACKGROUND

The importance of harvesting renewable energy continues to grow along with the concerns over carbon emissions and the threat of serious climate change resulting from fossil fuelled power generation and transport. An important contributor to the mix of renewable energy sources is that of wind energy which has led to the development of increasingly efficient and larger wind energy generators.

Large tower-mounted, three-bladed horizontal axis wind turbine power generators however, are only suitable for rural installations. Numerous attempts have been made to develop and improve the efficiency of more compact vertical axis machines which more readily lend themselves to urban installations, being particularly suitable for fluctuating, turbulent wind conditions.

Output of VAWT machines can be significantly improved if the pitch of the blades can be optimised relative to the range of wind velocity at which maximum energy extraction is possible. Control is complicated by the varying loads placed on the blades as they present at varying angles to the wind during rotation, inducing a tendency to "oscillate" with attendant vibration, noise and wear. Additionally, the system must be able to withstand high winds and still maintain peak power output, while not allow the speed of rotation to exceed that which can be accommodated within the mechanical constraints of the turbine structure, transmission and electrical generator.

It is an object of the present invention to address or at least ameliorate some of the above problems.

NOTES

The term "comprising" (and grammatical variations thereof) is used in this specification in the inclusive sense of "having" or "including", and not in the exclusive sense of "consisting only of".

The above discussion of the prior art in the Background of the invention, is not an admission that any information discussed therein is citable prior art or part of the common general knowledge of persons skilled in the art in any country.

BRIEF DESCRIPTION OF INVENTION

Accordingly, in a first broad form of the invention, there is provided a vertical axis wind turbine; said turbine including a vertical central shaft and a plurality of vertical blades; each of said vertical blades supported by at least one radial supporting arm extending from said central shaft; characterized in that angular disposition of each of said blades relative to its respective said at least one radial supporting arm, is controlled by a control mechanism; said mechanism including at least two differentially resilient elements and a damping element.

Preferably, the horizontal sections of each of said blades are airfoil shaped.

Preferably, each of said blades is pivotable about a vertical pivoting axis; said vertical pivoting axis passing through a primary pivot located at an outer end of each said radial supporting arm.

Preferably, the centre of gravity of each said blade lies between said primary pivot and the leading edge of said blade.

Preferably, the centre of gravity of each said blade lies between said primary pivot and the trailing edge of said blade.

Preferably, said angular disposition of each of said blades relative to its said radial supporting arm varies due to aerodynamic forces as said turbine is driven into rotational motion; outward rotation of said blade increasing with increasing rotational velocity of said turbine.

Preferably, said angular disposition of each of said blades relative to a said radial supporting arm varies due to a combination of centrifugal force and said aerodynamic forces generated by said airfoil shape of said blades; outward rotation of said blade increasing with increasing rotational velocity of said turbine.

Preferably, a first resilient element of said at least two differentially resilient elements controls variations in angular disposition of said blades for a first range of wind velocity; a second resilient element of said resilient elements controlling a further variation in said angular disposition of said blades to restrict maximum rotational velocity of said turbine; said first range of wind velocity lying between predetermined values V1 and V2.

Preferably, said control mechanism is supported by a sub-structure rigidly mounted in said outer end of each said supporting arm; said sub-structure including three pivot bearings comprising said primary pivot, a second pivot bearing for a second of said differentially resilient elements and a third pivot bearing for one end of said damping element.

Preferably, said control mechanism further includes a pivoting linkage arm; one outer end of said pivoting linkage arm pivotally connected to said primary pivot; said pivoting linkage arm pivotally supporting said first resilient element at a first pivot bearing of said pivoting linkage arm; an outer end of said first resilient element pivotally connected to said blade forward of said primary pivot.

Preferably, said second resilient element is pivotally connected to said second pivot bearing of said substructure; an outer end of said second resilient element pivotally connected to a second pivot bearing of said pivoting linkage arm.

Preferably, said damping element provides resistance to rapid changes in said angular disposition of a said blade; said damping element pivotally connected between said third pivot bearing of said substructure and a pivot bearing proximate the trailing end of said blade; said damping element arranged so as to allow unrestricted outward rotation of said blade but damping restriction on inward rotation.

Preferably, each of said differentially resilient elements comprises an assembly of an elongate shaft and a compression spring; said elongate shaft free-sliding through a shaft bearing block located at the respective pivot points of said resilient elements; said compression spring installed between said shaft bearing block and a retainer element at the outer end of said shaft; said retainer element adjustable for calibrating installed spring force of said compression springs.

Preferably, when installed for use, said compression spring of said first resilient element, is of a relatively greater spring rate with lower preload than said compression spring of said second resilient element when installed; said compression spring of said second resilient element being of a relatively lower spring rate with greater preload when installed, than said compression spring of said first resilient element.

Preferably, rotation of said blades about a central axis of said turbine is transferred to an electrical generator mounted to a support pylon of said turbine.

In another broad form of the invention, there is provided a method for controlling a vertical axis wind turbine; said method including control of angular disposition of blades of said turbine relative to radial supporting arms of said blades; said method including the steps of:
  (a) pivotally connecting said blades at outer ends of respective said radial supporting arms;
  (b) controlling changes in said angular position about a vertical axis of a said blade by at least two differentially resilient elements of a control mechanism,
  (c) controlling rapid changes in said angular disposition by a damping element,
wherein a first of said at least two differentially resilient elements controls said angular disposition in a first stage for rotational velocity of said turbine between zero and a maximum desired rotational velocity; a second of said at least two differentially resilient elements controlling in a second stage an additional angular disposition tending to aerodynamic stall of said blades.

Preferably, said control mechanism, in said first stage controls variation in said angular disposition to produce a power producing curve ranging between a first power output $P_1$ and a second power output $P_2$ for a predetermined range of wind velocity between $V_1$ and $V_2$.

Preferably, said control mechanism in said second stage maintains peak power at approximately $P_2$ for wind speeds above $V_2$.

In another broad form of the invention, there is provided a method of maintaining peak power output from a vertical axis wind turbine in high velocity wind conditions; said method including the steps of:
  (a) controlling angular disposition of blades of said turbine about a vertical axis by means of at least two differentially resilient elements,
  (b) calibrating a first of said resilient elements to allow outward rotation of said blades to produce a power curve in which generated power increases at a reducing rate as peak power is approached,
  (c) calibrating a second of said resilient elements to allow a further outward rotation of said blades; angle of attack of said blades tending to aerodynamic stall; rotational velocity of said turbine maintained as at said peak power for wind speeds exceeding wind speed at said peak power.

BRIEF DESCRIPTION OF DRAWINGS

Embodiments of the present invention will now be described with reference to the accompanying drawings wherein.

DETAILED DESCRIPTION OF PREFERRED EMBODIMENTS

Figure 1:
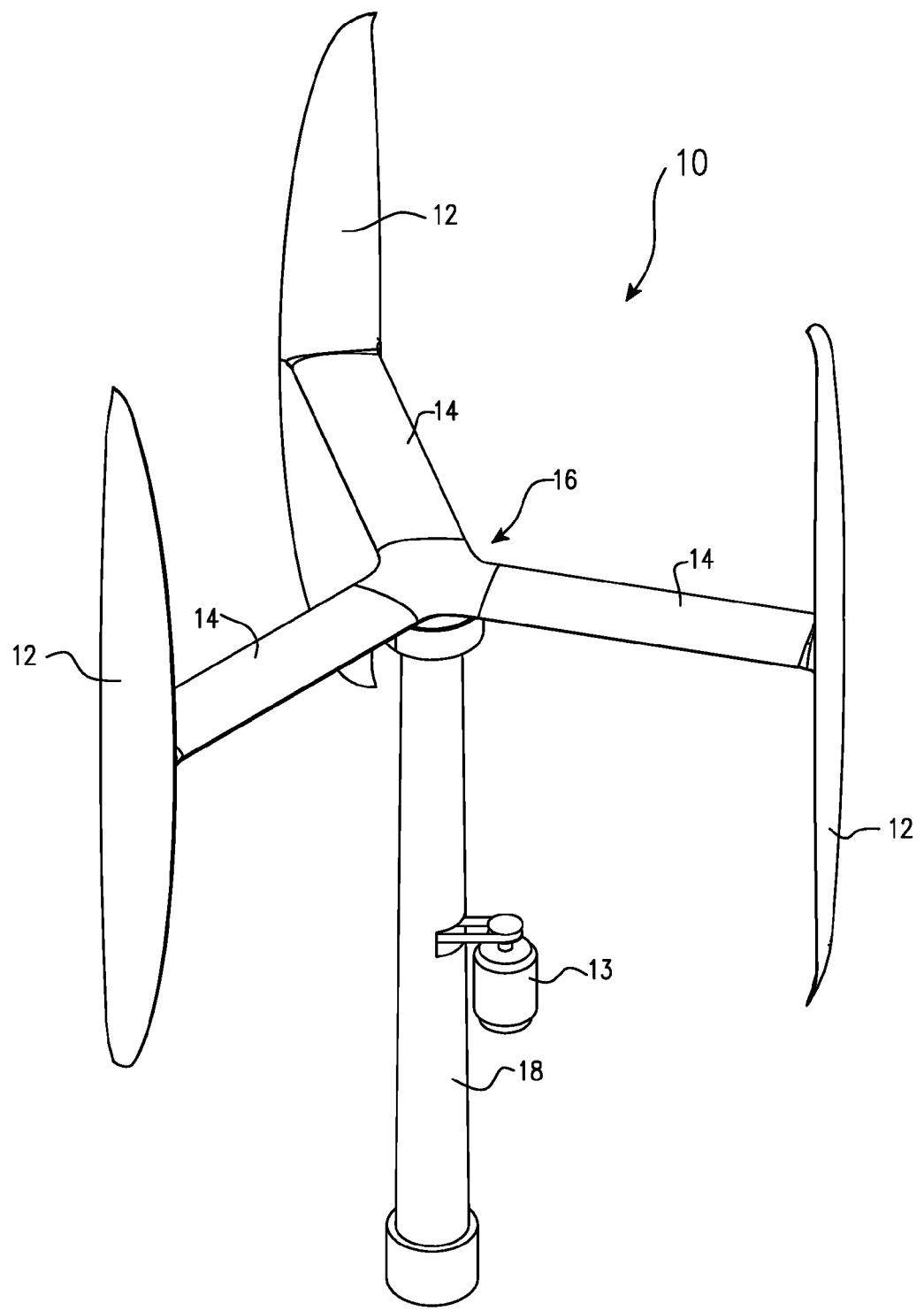
FIG. 1 is a perspective view of a vertical axis wind turbine according to the invention.
Figure 2:
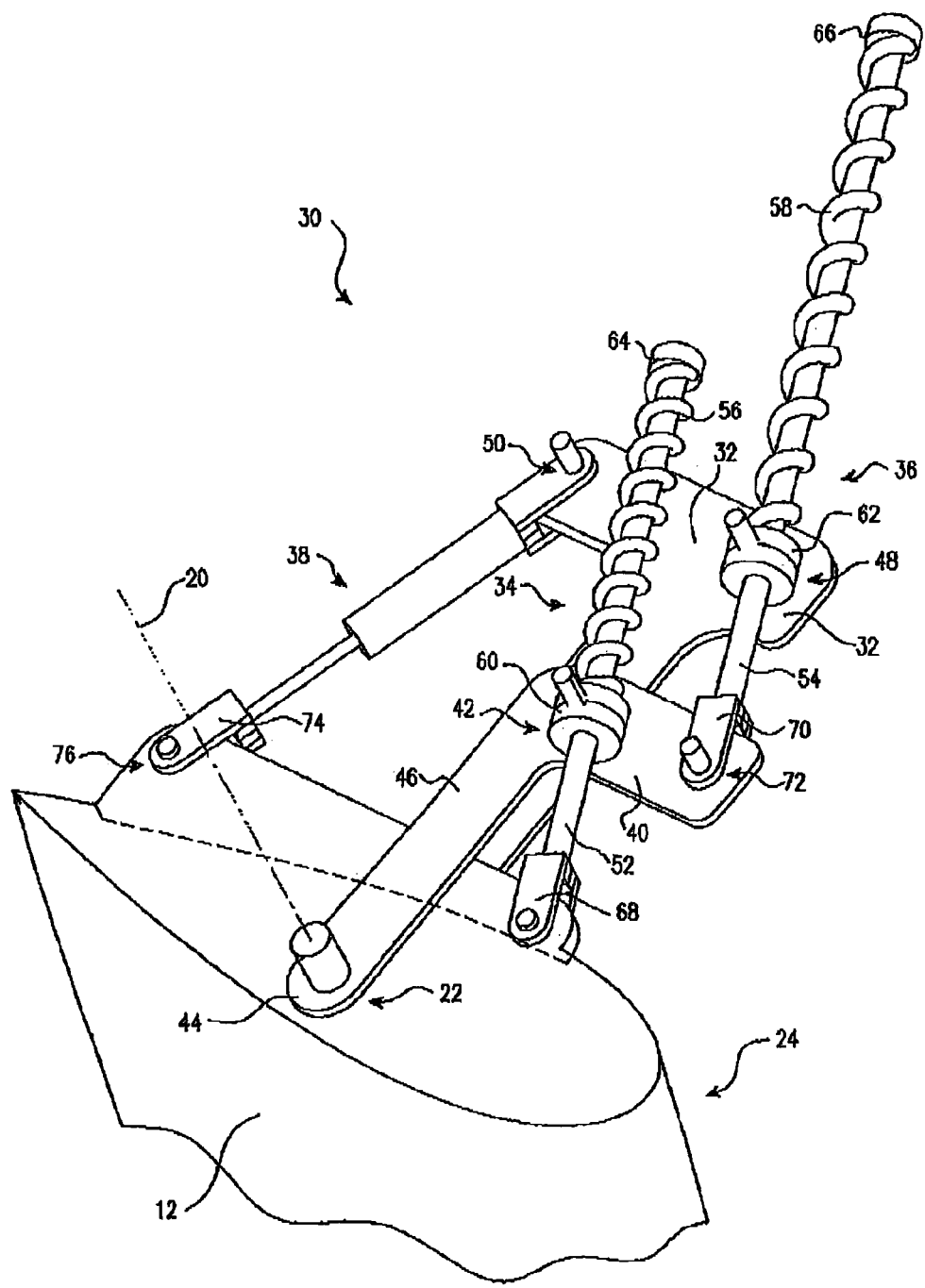
FIG. 2 is a perspective partly sectioned view of one of the blades of the turbine of FIG. 1 showing a preferred embodiment of a pitch control mechanism according to the invention.
Figure 3:
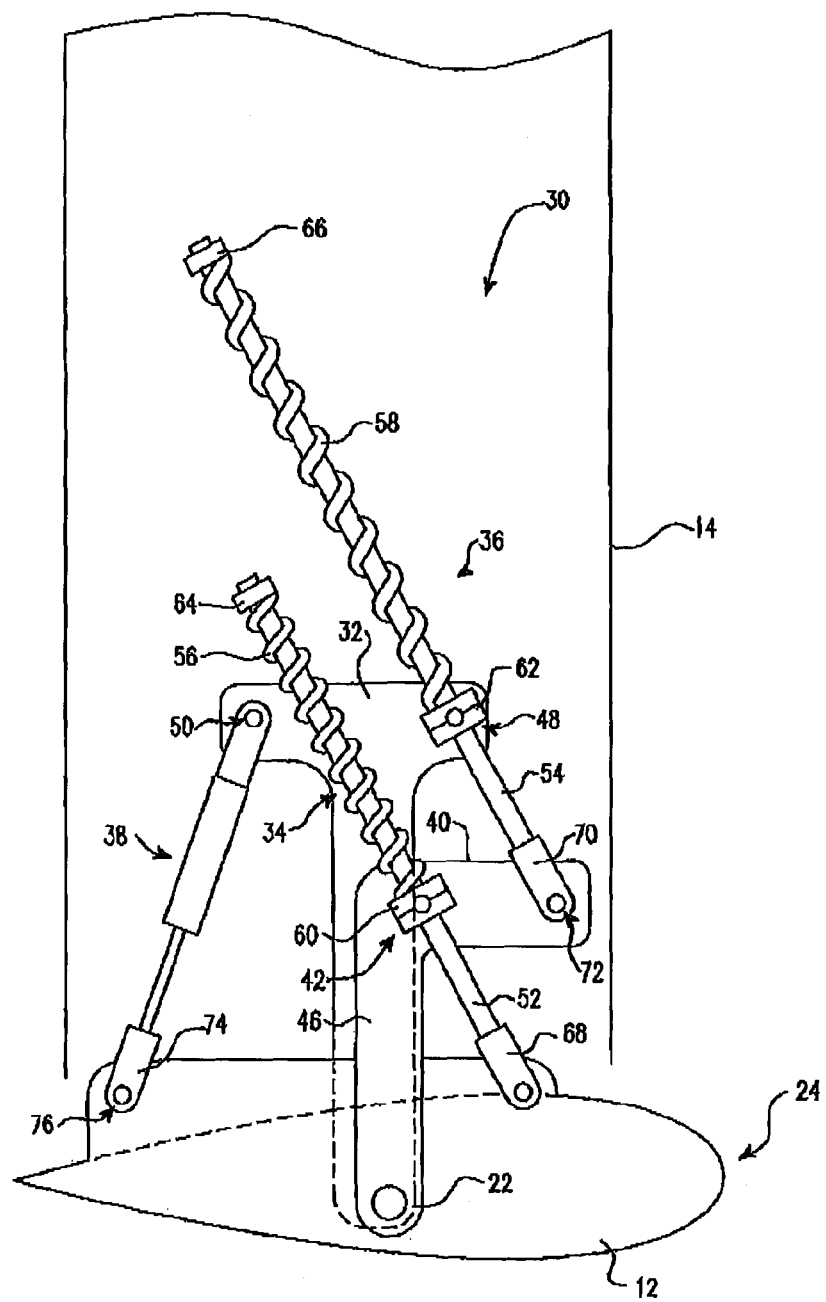
FIG. 3 is an orthogonal view of the control mechanism of FIG. 2 mounted at the outer end of a radial supporting arm of the turbine of FIG. 1, in a neutral position.

With reference to FIGS. 1 to 5, in a preferred embodiment of the invention, a vertical axis wind turbine power generator 10 is comprised of a plurality, preferably three, substantially vertical blades 12 mounted to radial supporting arms 14 extending from a central hub 16. Rotation of the blades 12 provides rotary input to an electrical power generator (shown in FIG. 1) mounted to the support pylon 18.

In the exemplary arrangement for a wind turbine shown in FIG. 1, each blade 12 is supported by a single support arm 14 but it will be understood that blades may be supported by more than one radial supporting arm.

Blades 12 are mounted to the support arms 14 such that they are pivotable about a vertical pivot axis 20 (see FIGS. 2) so as to vary the pitch or angular disposition of the blades relative, to their supporting arms. Again, in the exemplary arrangement of the preferred embodiment, the centre of gravity of a blade lies between the blade pivot point 22 (the primary pivot) located at the outer end of the supporting arm 14 and the blade's leading edge 24. The blades 12 are of airfoil shape in section so that as they rotate in response to wind air flow, each blade is subjected to both centrifugal and aerodynamic forces.

Figure 4:
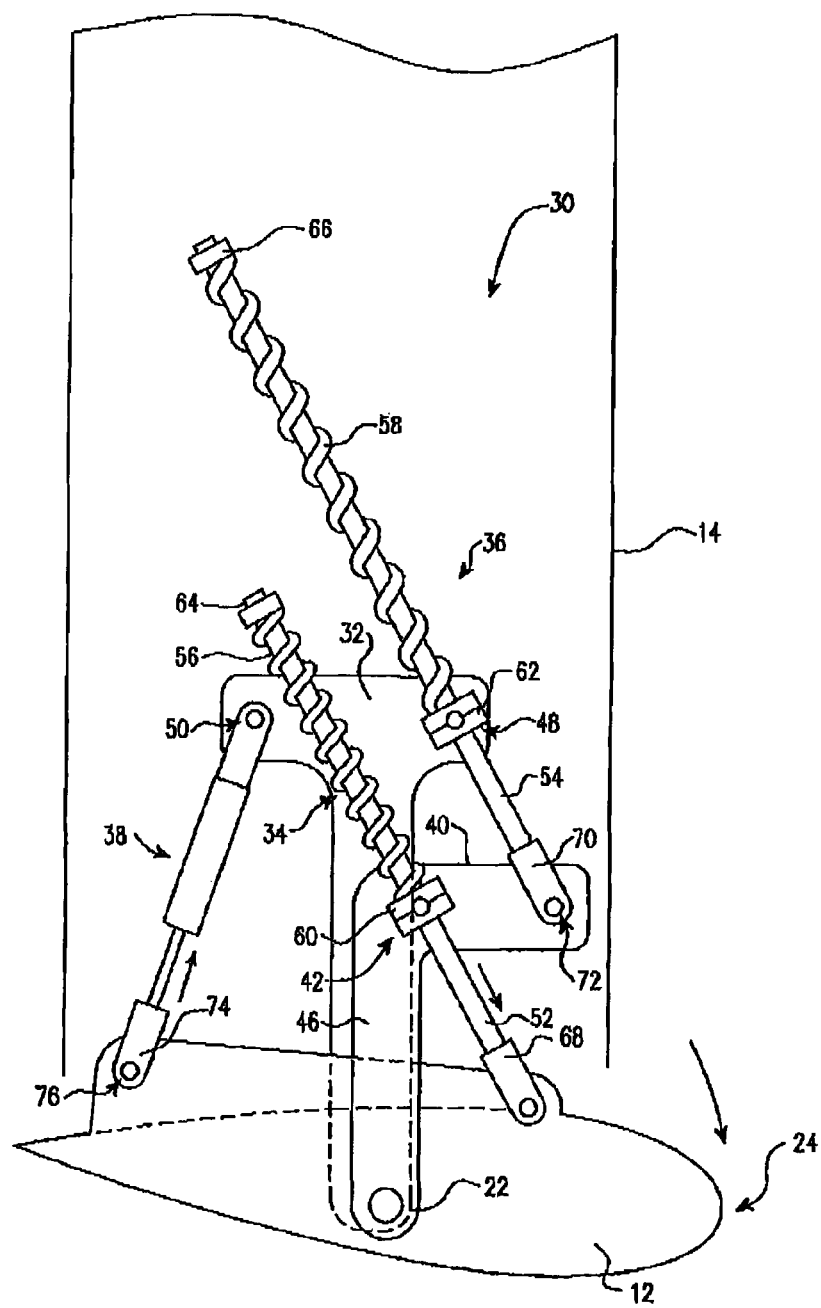
FIG. 4 is an orthogonal view of the control mechanism of FIGS. 2 and 3 in a first stage of response to centrifugal and aerodynamic forces.
Figure 5:
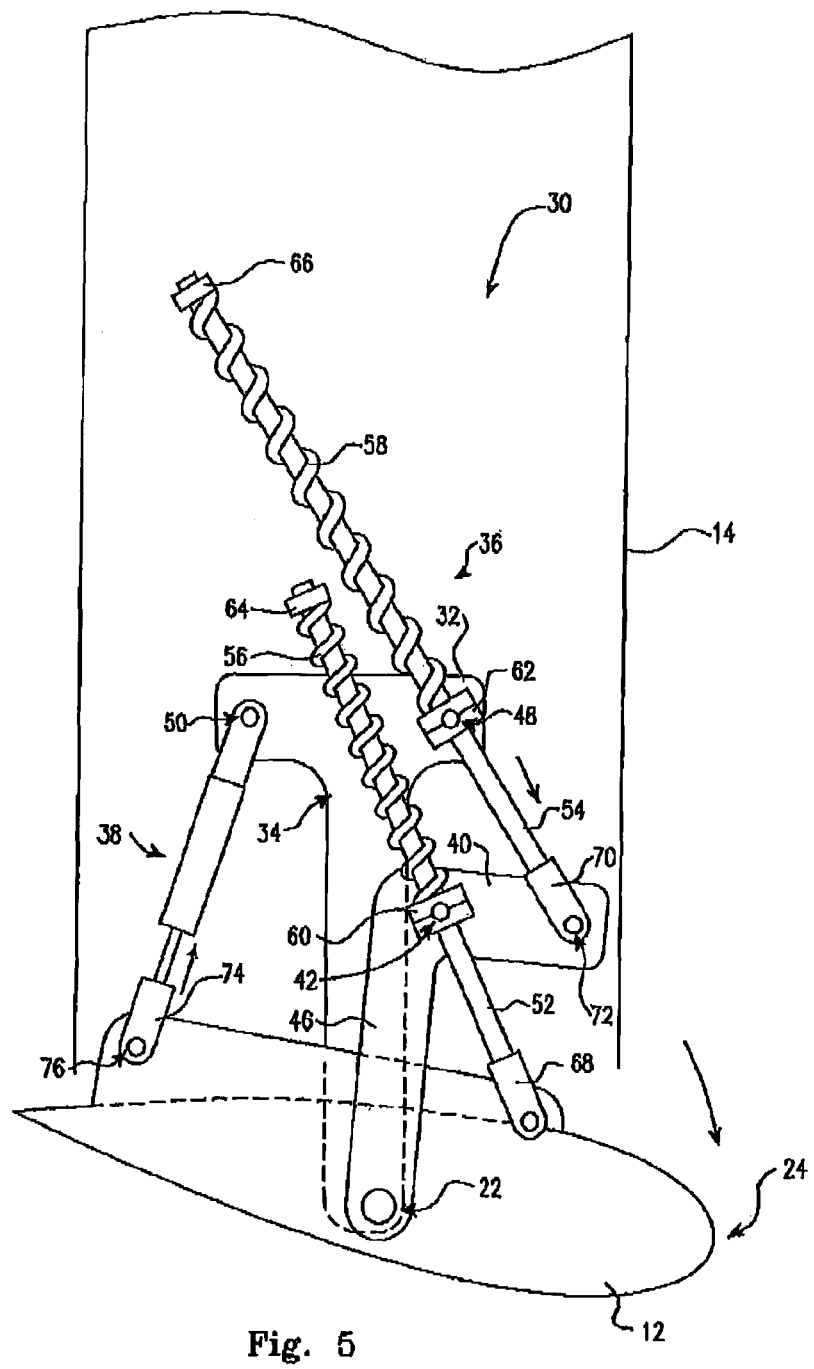
FIG. 5 is an orthogonal view of the control mechanism, of FIGS. 2 and 3 in a second stage of response to centrifugal and aerodynamic forces.

In the present arrangement, with the centre of gravity forward of the primary pivot point 22, and with a "concave out"airfoil (with respect to the turbine axis of rotation), both these forces tend to change the pitch of the blade, rotating it outwardly; that is, as indicated by the arrows in FIGS. 4 and 5, the distance of the leading edge 24 of the blade from the central axis of hub 16 increases with increasing rotational velocity of the blade.

The change of pitch of the blades 12 is controlled to optimise the output torque of the turbine in accordance with the machine's dimensions and electrical generator capacity. The outer end of each supporting arm 14 is provided with a control mechanism 30 as shown in FIGS. 2 to 5 mounted to a substructure 32, rigidly connected to the supporting arm 14. Control mechanism 30 includes at least two, differentially resilient elements, in this instance, two resilient elements 34 and 36, as well as a damping element 38.

Also included in the control mechanism 30 is a pivoting linkage arm 40. A first linkage arm pivot point 42 pivotally supports the first resilient element 34.

One outer end 44 of the pivoting linkage arm 40 is pivotally connected to the primary pivot 22 of the blade 12. The primary pivot 22 at this outer end of linkage arm 40, provides angular rotation of the blade 12 and of the linkage arm 40. As wall as the primary pivot 22, two other pivot points 48 and 50 are provided on the substructure 32. The first of these two pivot points 48, pivotally supports the second resilient element 36, with the second of pivot point 50 anchoring one end of the damping element 38.

The differentially resilient elements 34 and 36 of the control mechanism 30 of the invention, can take various forms, including elastomer and pneumatic springs, but preferably each element is an assembly of an elongate shaft 52/54 and a compression spring 56/58. The shafts are free sliding through shaft bearing blocks 60 and 62 respectively, pivotally mounted to the pivot points 42 and 48 supporting the resilient elements 34 and 36. The compression springs 56/58 locate over the elongate shafts 52/54 and are retained between the respective shaft bearing blocks 60 and 62 and retainer elements 64 and 66 at the respective outer ends of the shafts. These retainer elements 64 and 66 provide adjustment for preloading the compression springs, for example by being in the form of a threaded block running on a threaded section of the shaft.

The other ends of the elongate shafts 52/54 are provided with clevis fittings 68 and 70 respectively. In the case of the first resilient element 34, this clevis fitting 68 is pivotally connected to the blade 12 at a point forward of the primary pivot 22, while in the case of the second resilient element 36, the clevis fitting 70 is pivotally connected to a second linkage arm pivot point 72 at the other outer end of the linkage arm 40.

The resilient elements 34 and 36 are differential in that the spring rate of the first resilient element spring 56 is relatively greater and with a lower preload as compared to the second resilient element 36, the spring 58 of which has a relatively lower spring rate but higher preload.

Preferably, the damping element 38 may be in the form of a single acting pneumatic or hydraulic actuator, a clevis fitting 74 at the rod end of which is connected to a pivot point 76 proximate a trailing end of the blade 12. The single action of the damping element 38 is arranged so that outward rotation of the blade 12 is not restricted, but inward rotation is slowed by reaction of the actuator, minimising blade oscillation and maximising pitch angle throughout the turbine rotation cycle.

In Use

Figure 6:
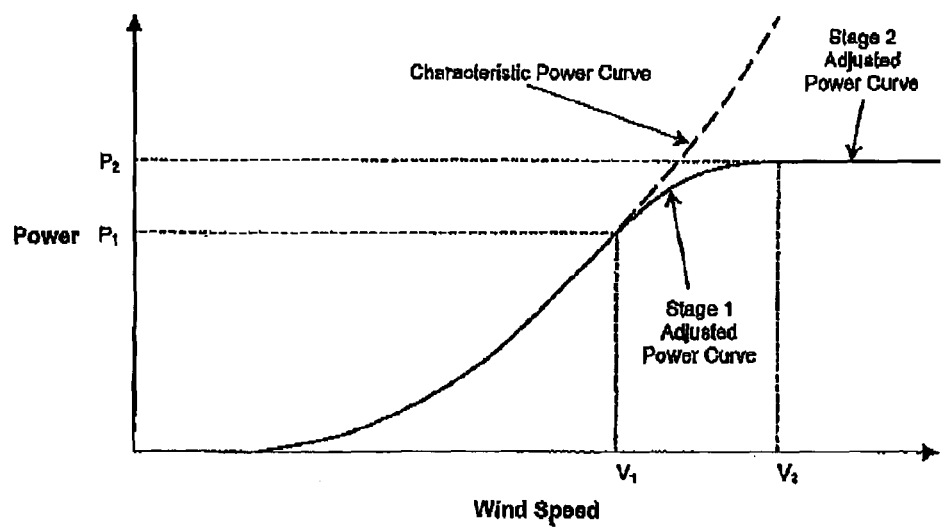
FIG. 6 is a graph of a projected power output curve for the wind turbine of FIGS. 1 to 5.

In use, the geometry of the control mechanism and the adjustable characteristics of the two resilient elements and damping element, provide pitch control of the blades in two stages. In a first stage, the first resilient element 34 allows a gradual outward rotation of the blade 12 commensurate with an increasing wind speed. With reference to FIG. 6, outward rotation of the blades commences at a predetermined initial wind speed ($V_1$), when combined centrifugal and aerodynamic forces exceed the calibrated preload of the first resilient element spring 56. Outward rotation proceeds gradually as wind speed increases to a point where the calibrated preload of the spring 58 of the second resilient element 36 is exceeded at a predetermined rated wind speed ($V_2$).

As can be seen from FIG. 4, up to this point, no pivoting rotation of the linkage arm 40 has occurred. Although subjected to moment about the primary pivot 22, the preload of the spring 58 of the second resilient element 36 was sufficient to prevent rotation of the linkage arm.

As indicated by the performance power curve of the turbine shown in FIG. 6, power output between $P_1$ and $P_2$ increases with wind speed between $V_1$ and $V_2$, but the rate of increase is gradually reduced as wind speed approaches $V_2$.

As wind speed approaches $V_2$, the preload of spring 58 the second resilient element 36, is overcome by the forces acting on the blade, allowing rotation of the linkage arm 40 and a consequent further rapid increase in outward rotation of the blade 12, tending towards aerodynamic stall. At the maximum rotation allowed by the combination of the two resilient elements, the pitch of the blades is such that further increases in wind speed do not translate into significantly higher rotational velocity of the turbine, which continues to rotate within a predetermined maximum within the capacity of the turbine structure and connected transmission and electrical generator.

Summary

The variable pitch mechanism according to the invention, is a passive device that provides overspeed protection and power regulation for a vertical axis wind turbine. The characteristic power curve is modified by action of the variable pitch mechanism to achieve an optimised power curve that maximises power generation in accordance with turbine dimensions and generator capacity. The mechanism, consisting of a linkage system, two resilient elements in the form of preloaded springs and an extension damper, adjusts the blade pitch angle with respect to wind velocity. The mechanism operates according to the following stages:

Stage 1—Again with reference to FIG. 6, combined aerodynamic and centrifugal forces acting on the blade exceed the preload of the spring of the first resilient element (high stiffness and low preload) at a specific predetermined wind speed $V_1$ corresponding to power $P_1$. The blade pitch angle gradually increases with increasing wind speed due to increasing aerodynamic and centrifugal forces, resulting in the gradual, decrease of the effective angle of attack. Power is gradually decreased in relation to tho characteristic power curve ouch that power output remains within electrical generator limits.

Stage 2—Combined aerodynamic and centrifugal forces acting on the blade exceed preload of the spring of the second resilient element (low stiffness and high preload) at a wind speed V2 corresponding to peak power P2. The blade pitch angle rapidly increases with increasing wind speed due to the increasing aerodynamic and centrifugal forces, resulting in a rapid decrease in the effective angle of attack (towards aerodynamic stall). Peak power and rotational speed are maintained automatically at higher wind speeds in accordance with electrical generator and turbine structural limits.

The operation of the variable pitch mechanism of the present invention and its influence on the power curve is illustrated in FIG. 6.

The outward normal force component of the combined aerodynamic and centrifugal forces determines the blade angular position. The outward normal force varies sinusoidally with angular position throughout the rotation cycle. The single acting damper allows the blade to rotate outwards without damping, and resists inward blade rotation with damping resistance, maximizing blade pitch angle throughout the rotation cycle.

The above describes only some embodiments of the present invention and modifications, obvious to those skilled in the art, can be made thereto without departing from the scope of the present invention. For example, although the above description is for control of outward rotation of the turbine blades, with a movement of the centre of gravity of the blades to a position rearward from the primary pivot point and the airfoil configured "concave in", the principles of the mechanism could be applied to control an inward rotation of the blades. In that case the compression springs of the control mechanism could be replaced with extension springs to achieve the same functionality.

It will further be understood by those skilled in the art that the mechanism of the invention may also be effectively used with blades of a symmetrical profile, or that the effect of centrifugal force can be neutralised by placement of the primary pivot at the centre of gravity of the blade so that its rotation is only due to aerodynamic forces.

The invention claimed is:

1. A vertical axis wind turbine; said turbine including a vertical central shaft and a plurality of vertical blades; each of said vertical blades supported by at least one radial supporting arm extending from said central shaft; characterized in that angular disposition of each of said blades relative to its respective said at least one radial supporting arm, is controlled by a control mechanism; said mechanism including at least two differentially resilient elements and a damping element; and wherein said control mechanism includes a pivoting linkage arm; one outer end of said pivoting linkage arm pivotally connected to a primary pivot of said blade; said pivoting linkage arm pivotally supporting a first resilient element of said at least two elements of different resilience; said first resilient element controlling angular disposition of said blade in a first stage of rotational velocity between zero and a maximum desired rotational velocity of said turbine; an outer end of said first resilient element pivotally connected to said blade forward of said primary pivot, and wherein a second resilient member of said at least two elements of different resilience controls in a second stage angular disposition of said pivoting linkage arm relative said blade for an additional angular disposition of said blade.

2. The turbine of claim 1 wherein the horizontal sections of each of said blades is airfoil shaped.

3. The turbine of claim 1 wherein each of said blades is pivotable about a vertical pivoting axis; said vertical pivoting axis passing through a primary pivot located at an outer end of each said radial supporting arm.

4. The turbine of claim 3 wherein the centre of gravity of each said blade lies between said primary pivot and the leading edge of said blade.

5. The turbine of claim 3 wherein the centre of gravity of each said blade lies between said primary pivot and the trailing edge of said blade.

6. The turbine of claim 1 wherein said angular disposition of each of said blades relative to its said radial supporting arm varies due to aerodynamic forces as said turbine is driven into rotational motion; outward rotation of said blade increasing with increasing rotational velocity of said turbine.

7. The turbine of claim 1 wherein said angular disposition of each of said blades relative to a said radial supporting arm varies due to a combination of centrifugal force and said aerodynamic forces generated by said airfoil shape of said blades; outward rotation of said blade increasing with increasing rotational velocity of said turbine.

8. The turbine of claim 1 wherein a first resilient element of said at least two differentially resilient elements controls variations in angular disposition of said blades for a first range of wind velocity; a second resilient element of said resilient elements controlling a further variation in said angular disposition of said blades to restrict maximum rotational velocity of said turbine.

9. The turbine of claim 3 wherein said control mechanism is supported by a sub-structure rigidly mounted in said outer end of each said supporting arm; said sub-structure including three pivot bearings comprising said primary pivot, a second pivot bearing for a second of said differentially resilient elements and a third pivot bearing for one end of said damping element.

10. The turbine of claim 6 wherein said pivoting linkage arm pivotally supporting said first resilient element at a first pivot bearing of said pivoting linkage arm; an outer end of said first resilient element pivotally connected to said blade forward of said primary pivot.

11. The turbine of claim 10 wherein said second resilient element is pivotally connected to a second pivot bearing of a substructure; an outer end of said second resilient element pivotally connected to a second pivot bearing of said pivoting linkage arm.

12. The turbine of claim 9 wherein said damping element provides resistance to rapid changes in said angular disposition of a said blade; said damping element pivotally connected between said third pivot bearing of said substructure and a pivot bearing proximate the trailing end of said blade; said damping element arranged so as to allow unrestricted outward rotation of said blade but damping restriction on inward rotation.

13. The turbine of claim 1 wherein each of said differentially resilient elements comprises an assembly of an elongate shaft and a compression spring; said elongate shaft free-sliding through a shaft bearing block located at the respective pivot points of said resilient elements; said compression spring installed between said shaft bearing block and a retainer element at the outer end of said shaft; said retainer element adjustable for calibrating installed spring force of said compression springs.

14. The turbine of claim 13 wherein, when installed for use, said compression spring of said first resilient element, is of a relatively greater spring rate with lower preload than said compression spring of said second resilient element when installed; said compression spring of said second resilient element being of a relatively lower spring rate with greater preload when installed, than said compression spring of said first resilient element.

15. The turbine of claim 1 wherein rotation of said blades about a central axis of said turbine is transferred to an electrical generator mounted to a support pylon of said turbine.

16. A method for controlling a vertical axis wind turbine; said method including control of angular disposition of blades of said turbine relative to radial supporting arms of said blades; said method including the steps of:
(a) pivotally connecting said blades at outer ends of respective said radial supporting arms,
(b) controlling changes in said angular position about a vertical axis of a said blade by at least two differentially resilient elements of a control mechanism,
(c) controlling rapid changes in said angular disposition by a damping element,
wherein a first of said at least two differentially resilient elements controls said angular disposition in a first stage for rotational velocity of said turbine between zero and a maximum desired rotational velocity; a second of said at least two differentially resilient elements controlling in a second stage an additional angular disposition tending to aerodynamic stall of said blades, sand wherein said control mechanism includes a pivoting linkage arm; one outer end of said pivoting linkage arm pivotally connected to a primary pivot of said blade; said pivoting linkage arm pivotally supporting a first resilient element of said at least two elements of different resilience; an outer end of said first resilient element pivotally connected to said blade forward of said primary pivot.

17. A method of maintaining peak power output from a vertical axis wind turbine in high velocity wind conditions; said method including the steps of:
(a) controlling angular disposition of blades of said turbine about a vertical axis by means of at least two differentially resilient elements,
(b) calibrating a first of said resilient elements to allow outward rotation of said blades to produce a power curve in which generated power increases at a reducing rate as peak power is approached,
(c) calibrating a second of said resilient elements to allow a further outward rotation of said blades; angle of attack of said blades tending to aerodynamic stall; rotational velocity of said turbine maintained as at said peak power for wind speeds exceeding wind speed at said peak power, and wherein said control mechanism includes a pivoting linkage arm; one outer end of said pivoting linkage arm pivotally connected to a primary pivot of said blade; said pivoting linkage arm pivotally supporting a first resilient element of said at least two elements of different resilience; an outer end of said first resilient element pivotally connected to said blade forward of said primary pivot.

\* \* \* \* \*